(12) United States Patent
Sandin (10) Patent No.: US 9,503,846 B2
(45) Date of Patent: Nov. 22, 2016

(54) EMBEDDED LOCATION TRACKING SYSTEMS FOR SPORTS EQUIPMENT

(71) Applicant: Nicholas Sandin, Portland, OR (US)

(72) Inventor: Nicholas Sandin, Portland, OR (US)

(*) Notice: Subject to any disclaimer, the term of this patent is extended or adjusted under 35 U.S.C. 154(b) by 51 days.

(21) Appl. No.: 14/531,773

(22) Filed: Nov. 3, 2014

(65) Prior Publication Data

US 2016/0050519 A1 Feb. 18, 2016

Related U.S. Application Data

(60) Provisional application No. 62/037,504, filed on Aug. 14, 2014.

(51) Int. Cl.
*G06K 7/10* (2006.01)
*H04W 4/02* (2009.01)
*G01S 19/16* (2010.01)
*G08B 21/02* (2006.01)

(52) U.S. Cl.
CPC ............ *H04W 4/02* (2013.01); *G01S 19/16* (2013.01); *G06K 7/10366* (2013.01); *G08B 21/028* (2013.01); *G08B 21/0269* (2013.01); *G08B 21/0277* (2013.01)

(58) Field of Classification Search
CPC ....... G07C 9/00111; G01S 1/02; G01S 3/02; G08C 19/20; H04W 4/02; G06K 7/10; G06K 7/10366
USPC .............................. 340/8.1, 870.11; 342/463
See application file for complete search history.

(56) References Cited

U.S. PATENT DOCUMENTS

| | | | | |
|---|---|---|---|---|
| 7,333,001 B2* | 2/2008 | Lane | ................... | G06K 19/025 340/10.1 |
| 7,839,273 B2* | 11/2010 | Tabe | .................. | B60C 23/0408 340/442 |
| 8,026,814 B1* | 9/2011 | Heinze | .................. | G06Q 10/06 340/10.1 |
| 8,618,913 B1* | 12/2013 | Bailey | .................. | H04W 12/08 340/10.1 |
| 2002/0083858 A1* | 7/2002 | MacDiarmid | .......... | B41M 3/006 101/484 |
| 2007/0042844 A1* | 2/2007 | Stote | ...................... | A63B 59/00 473/564 |
| 2007/0296581 A1* | 12/2007 | Schnee | .................. | G06Q 10/08 340/572.1 |
| 2008/0231445 A1* | 9/2008 | Rodgers | ................. | G06Q 10/08 340/568.7 |
| 2008/0246656 A1* | 10/2008 | Ghazarian | ............ | G08B 25/016 342/357.54 |
| 2008/0266110 A1* | 10/2008 | Hayford | ............... | H04B 5/0062 340/572.8 |
| 2009/0153305 A1* | 6/2009 | Ambrosetti | ........... | G01S 5/0257 340/10.31 |

(Continued)

*Primary Examiner* — Allen T Cao
(74) *Attorney, Agent, or Firm* — Mohr Intellectual Property Law Solutions, PC (57) ABSTRACT

Embedded location tracking systems for sports equipment that include a locator tag embedded within an item of sports equipment in such a fashion that removal of the tag results in severe damage to the sports equipment. The tag is capable of determining its location and continually reporting this location over a wireless data network to a server for use by the owner of the sports equipment. The sports equipment can include any item capable of receiving the locator tag in a fashion manner that would result in serious damage to the equipment upon removal. Examples include skis, a snowboard, watersports equipment, or bicycles.

20 Claims, 7 Drawing Sheets

(56) References Cited

U.S. PATENT DOCUMENTS

| | | | |
|---|---|---|---|
| 2009/0231198 A1* | 9/2009 | Walsh | A63B 24/0021 342/463 |
| 2010/0283630 A1* | 11/2010 | Alonso | H04Q 9/00 340/870.11 |
| 2013/0066448 A1* | 3/2013 | Alonso | H04Q 9/00 700/91 |
| 2014/0028447 A1* | 1/2014 | Howard | G06Q 10/087 340/10.6 |
| 2014/0205155 A1* | 7/2014 | Chung | G06K 9/00362 382/115 |
| 2014/0240088 A1* | 8/2014 | Robinette | G08B 13/1427 340/5.61 |
| 2015/0070140 A1* | 3/2015 | Chakraborty | G06Q 50/00 340/10.31 |
| 2015/0084813 A1* | 3/2015 | Braiman | G01S 19/06 342/357.51 |
| 2015/0213295 A1* | 7/2015 | Ginsburg | H04W 64/00 340/10.1 |
| 2015/0334291 A1* | 11/2015 | Cho | G06F 3/0488 348/222.1 |
| 2015/0338979 A1* | 11/2015 | Rhee | G06F 3/0414 345/174 |

\* cited by examiner

EMBEDDED LOCATION TRACKING SYSTEMS FOR SPORTS EQUIPMENT

CROSS REFERENCE TO RELATED APPLICATIONS

This application claims priority to U.S. Provisional Application Ser. No. 62/037,504, filed on 14 Aug. 2014, which is hereby incorporated by reference for all purposes.

BACKGROUND

The present disclosure relates generally to sports equipment. In particular, systems using locator tags to track sports equipment and associated users are described.

Outdoor enthusiasts frequently invest in expensive equipment to enjoy their sport(s) of choice. For example, people who ski or snowboard may spend hundreds, if not thousands, of dollars on their equipment, which includes skis or a snow board and associated boots and bindings. At popular winter sports resorts, theft of this expensive equipment becomes an increasing possibility, especially for those times when the equipment owner needs to leave the equipment unattended, e.g. while eating, or going inside a lodge. Likewise, people who enjoy watersports such as skiing, surfing, windsurfing or parasailing may have to occasionally leave expensive equipment unattended. Still a further example, people who enjoy bicycling may spend thousands of dollars on their equipment and have to leave it unattended to a bicycle locking rack or facility while they go about their business. Thus, any system that can reduce the likelihood of theft by offering a deterrent while enhancing the likelihood of recovering stolen equipment would be useful.

In addition to theft, engaging in sports such as snow skiing, snowboarding, water skiing, surfing, windsurfing and parasailing poses inherent risks. In snow-bound country, skiers and snowboarders may inadvertently wander off-trail, be caught in an avalanche, or otherwise be incapacitated in a location that isn't immediately visible to anyone trying to locate the endangered skier or snowboarder. For watersports, the participant could be knocked unconscious or be caught in a current or tide that carries the participant away from shore support or boat assistance, and, if the current is sufficiently swift, quickly be swept beyond visual range of a rescue party. Thus, a system that can independently provide the user's location to rescuers is desirable.

A further need for users engaging in sports is to track their travels for logging, record keeping, and health-monitoring purposes. A system that can provide and historically store a continuously updated location as a user engages in sports activities provides useful data to the user for determining calories burned, level of strenuousness of a workout, and setting personal records with respect to speed, distance, time, etc. To further enhance a user's exercise experience, this data could be shared on social media sites to engage in friendly competition and obtain support and encouragement from friends and family. Thus, a system that can supply and record a continuously updated location of its user, and provide for historical review and sharing of the same, is desirable.

Known systems of theft deterrence and location tagging are not entirely satisfactory for the range of applications in which they are employed. For example, existing theft deterrent systems typically involve securing equipment to an immoveable object, such as a post, railing, or rack. Employment of such a system requires a separate locking device, adding to the amount of equipment that the user must carry. If the user forgets to bring the locking device or neglects to deploy it, the equipment is not secured, and is subject to theft. Moreover, conventional locking systems, if they are defeated by a thief, provide no way of tracking down and recovering the stolen equipment. Defeat of the conventional locking systems can leave the stolen equipment undamaged, retaining its resale value, and providing further incentive to theft. Known systems for location tagging suffer from similar deficiencies. Personal locator beacons are yet another piece of equipment that a user must remember to bring, and wear upon their person. The embedding of GPS tags in ski resort lift tickets helps to solve the problem of a user forgetting to bring a locator beacon. However, as the beacon or lift ticket is located on the user, it still offers no theft deterrence for the user's equipment.

As an alternative, smartphones such as the Apple iPhone® or devices running Android® can be equipped with location detection devices, and can run applications that provide historical location tracking for various purposes, including exercise and fitness. In addition, the location detection devices on smartphones can be configured to provide a location of the phone to a remote user to aid in locating and recovering the device. However, as with the personal locator beacons or GPS tags embedded in lift tickets mentioned above, to be useful for these purposes the smartphone must be carried on the user. When used in the sorts of damp or dusty environments encountered while engaging in biking, skiing, or watersports, the smartphone could potentially be rendered inoperable. Likewise, not being attached to the sports equipment, a smartphone offers no protection against theft of the equipment; in fact, the smartphone itself becomes an attractive target of theft, due to its value.

Thus, there exists a need for systems that improve upon and advance the design of both known anti-theft systems and location systems. Examples of new and useful tracking systems relevant to the needs existing in the field are discussed below.

SUMMARY

The present disclosure is directed to a locator tag embedded within an item of sports equipment in such a fashion that removal of the tag results in severe damage to the sports equipment. The tag is capable of determining its location and continually reporting this location over a wireless data network to a server for use by the owner of the sports equipment. The sports equipment can include any item capable of receiving the locator tag in a fashion manner that would result in serious damage to the equipment upon removal. Examples include skis, a snowboard, watersports equipment, or bicycles.

DETAILED DESCRIPTION

The disclosed embedded tracking systems will become better understood through review of the following detailed description in conjunction with the figures. The detailed description and figures provide merely examples of the various inventions described herein. Those skilled in the art will understand that the disclosed examples may be varied, modified, and altered without departing from the scope of the inventions described herein. Many variations are contemplated for different applications and design considerations; however, for the sake of brevity, each and every contemplated variation is not individually described in the following detailed description.

Throughout the following detailed description, examples of various embedded tracking systems are provided. Related features in the examples may be identical, similar, or dissimilar in different examples. For the sake of brevity, related features will not be redundantly explained in each example. Instead, the use of related feature names will cue the reader that the feature with a related feature name may be similar to the related feature in an example explained previously. Features specific to a given example will be described in that particular example. The reader should understand that a given feature need not be the same or similar to the specific portrayal of a related feature in any given figure or example.

With reference to FIGS. 1 to 5, a first example of an embedded tracking system, system 30, will now be described. System 30 functions by providing a permanently embedded locator tag within sports equipment implementing the disclosed invention. As will be described further herein, the locator tag is ideally embedded in a location and in such a fashion on the sports equipment so that any attempts at removal will result in the sport equipment being rendered useless and/or worthless. This locator tag can be registered with a website that in turn interfaces with a wireless network used to signal the embedded locator tag to report its position, thereby enabling the system 30 user to track and map the location of the tagged sports equipment. Additionally or alternatively, system 30 can be used to deter theft simply by placing a notification on the equipment that it is equipped with the permanently embedded locator tag, which places would-be thieves on notice that theft of the tagged equipment will result in their being located by law enforcement.

System 30 addresses many of the shortcomings existing with conventional tracking and theft deterrent devices and systems. For example, by embedding the locator tag within the equipment, the user is relieved of the necessity of remembering to bring an additional piece of equipment. As the locator tag is ideally embedded in equipment that is essential to participating in the sport for which the equipment is designed, a way of locating the user in the event a rescue is needed is virtually assured. The locator tag is also ideally embedded in such a way that removal is nearly impossible without doing significant damage to the equipment, which diminishes possible resale value or further use, and consequently diminishes incentive to steal the equipment. Failing to remove the locator tag effectively turns the stolen equipment into a homing beacon for thieves for as long as they retain possession of the equipment, and facilitates recovery of the equipment if lost or stolen.

Various disclosed examples may be implemented using electronic circuitry configured to perform one or more functions. For example, with some embodiments of the invention, the disclosed examples may be implemented using one or more application-specific integrated circuits (ASICs). More typically, however, components of various examples of the invention will be implemented using a programmable computing device executing firmware or software instructions, or by some combination of purpose-specific electronic circuitry and firmware or software instructions executing on a programmable computing device.

Figure 1:
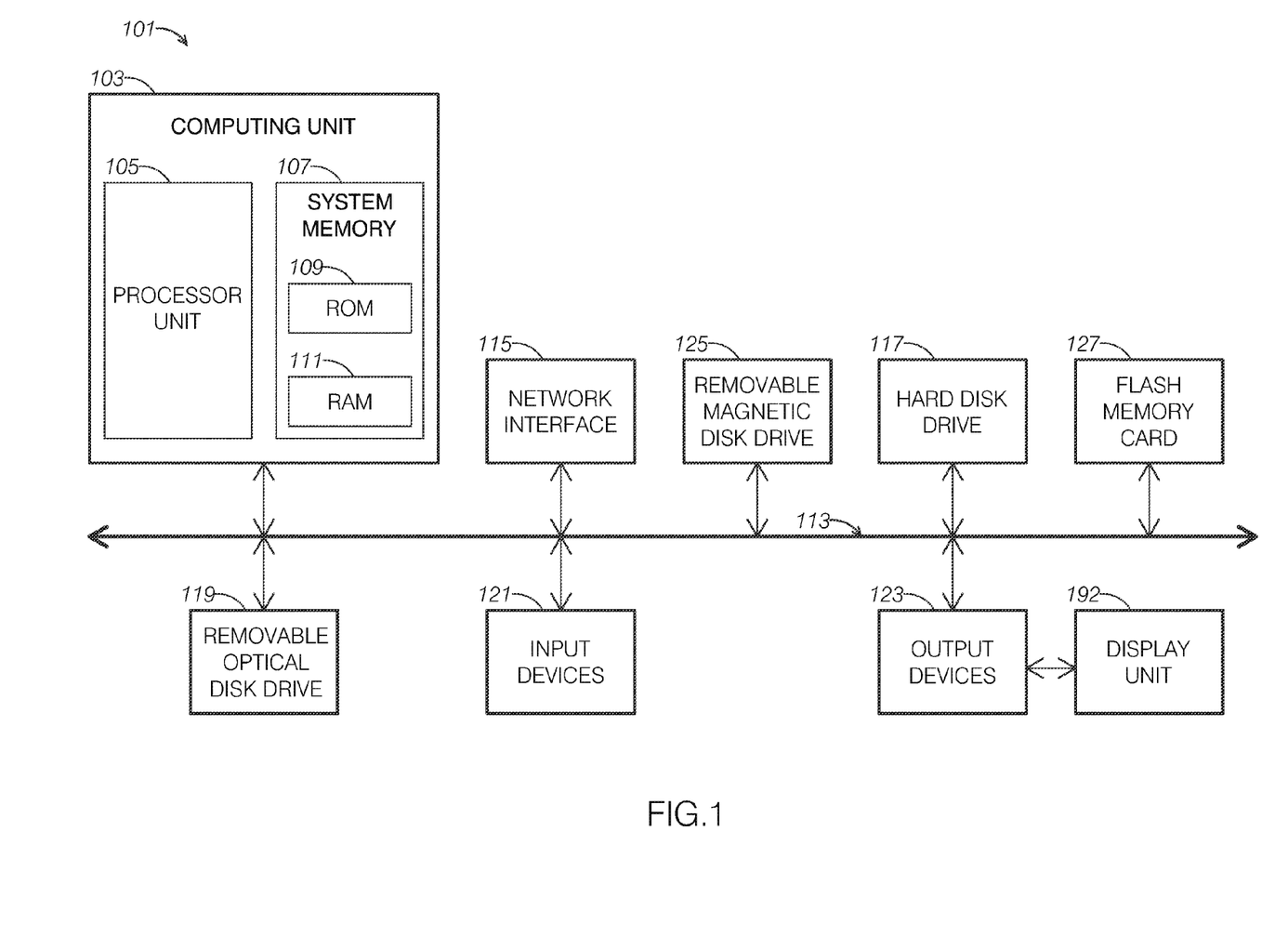
FIG. 1 shows a schematic view of an example of a programmable computing device.

Accordingly, FIG. 1 shows one illustrative example of a computer, computer 101, which can be used to implement various embodiments of the invention. Computer 101 may be incorporated within a variety of consumer electronic devices, such as personal media players, cellular phones, smart phones, personal data assistants, global positioning system devices, and the like.

As seen in this figure, computer 101 has a computing unit 103. Computing unit 103 typically includes a processing unit 105 and a system memory 107. Processing unit 105 may be any type of processing device for executing software instructions, but will conventionally be a microprocessor device. System memory 107 may include both a read-only memory (ROM) 109 and a random access memory (RAM) 111. As will be appreciated by those of ordinary skill in the art, both read-only memory (ROM) 109 and random access memory (RAM) 111 may store software instructions to be executed by processing unit 105.

Processing unit 105 and system memory 107 are connected, either directly or indirectly, through a bus 113 or alternate communication structure to one or more peripheral devices. For example, processing unit 105 or system memory 107 may be directly or indirectly connected to additional memory storage, such as a hard disk drive 117, a removable optical disk drive 119, a removable magnetic disk drive 125, and a flash memory card 127. Processing unit 105 and system memory 107 also may be directly or indirectly connected to one or more input devices 121 and one or more output devices 123. Input devices 121 may include, for example, a keyboard, touch screen, a remote control pad, a pointing device (such as a mouse, touchpad, stylus, trackball, or joystick), a scanner, a camera or a microphone. Output devices 123 may include, for example, a monitor display, an integrated display, television, printer, stereo, or speakers.

Still further, computing unit 103 will be directly or indirectly connected to one or more network interfaces 115 for communicating with a network. This type of network interface 115 is also sometimes referred to as a network adapter or network interface card (NIC). Network interface 115 translates data and control signals from computing unit 103 into network messages according to one or more communication protocols, such as the Transmission Control Protocol (TCP), the Internet Protocol (IP), and the User Datagram Protocol (UDP). These protocols are well known in the art, and thus will not be discussed here in more detail. An interface 115 may employ any suitable connection agent for connecting to a network, including, for example, a wireless transceiver, a power line adapter, a modem, or an Ethernet connection.

It should be appreciated that, in addition to the input, output and storage peripheral devices specifically listed above, the computing device may be connected to a variety of other peripheral devices, including some that may perform input, output and storage functions, or some combination thereof. For example, the computer 101 may be connected to a digital music player, such as an IPOD® brand digital music player or iOS or Android based smartphone. As known in the art, this type of digital music player can serve as both an output device for a computer (e.g., outputting music from a sound file or pictures from an image file) and a storage device.

In addition to a digital music player, computer 101 may be connected to or otherwise include one or more other peripheral devices, such as a telephone. The telephone may be, for example, a wireless "smart phone," such as those featuring the Android or iOS operating systems. As known in the art, this type of telephone communicates through a wireless network using radio frequency transmissions. In addition to simple communication functionality, a "smart phone" may also provide a user with one or more data management functions, such as sending, receiving and viewing electronic messages (e.g., electronic mail messages, SMS text messages, etc.), recording or playing back sound files, recording or playing back image files (e.g., still picture or moving video image files), viewing and editing files with text (e.g., Microsoft Word or Excel files, or Adobe Acrobat files), etc. Because of the data management capability of this type of telephone, a user may connect the telephone with computer 101 so that their data maintained may be synchronized.

Of course, still other peripheral devices may be included with or otherwise connected to a computer 101 of the type illustrated in FIG. 1, as is well known in the art. In some cases, a peripheral device may be permanently or semi-permanently connected to computing unit 103. For example, with many computers, computing unit 103, hard disk drive 117, removable optical disk drive 119 and a display are semi-permanently encased in a single housing.

Still other peripheral devices may be removably connected to computer 101, however. Computer 101 may include, for example, one or more communication ports through which a peripheral device can be connected to computing unit 103 (either directly or indirectly through bus 113). These communication ports may thus include a parallel bus port or a serial bus port, such as a serial bus port using the Universal Serial Bus (USB) standard or the IEEE 1394 High Speed Serial Bus standard (e.g., a Firewire port). Alternately or additionally, computer 101 may include a wireless data "port," such as a Bluetooth® interface, a Wi-Fi interface, an infrared data port, or the like.

It should be appreciated that a computing device employed according to the various examples of the invention may include more components than computer 101 illustrated in FIG. 1, fewer components than computer 101, or a different combination of components than computer 101. Some implementations of the invention, for example, may employ one or more computing devices that are intended to have a very specific functionality, such as a digital music player or server computer. These computing devices may thus omit unnecessary peripherals, such as the network interface 115, removable optical disk drive 119, printers, scanners, external hard drives, etc. Some implementations of the invention may alternately or additionally employ computing devices that are intended to be capable of a wide variety of functions, such as a desktop or laptop personal computer. These computing devices may have any combination of peripheral devices or additional components as desired.

In many examples, computers may define mobile electronic devices, such as smartphones, tablet computers, or portable music players, often operating the iOS, Symbian, Windows-based (including Windows Mobile and Windows 8), or Android operating systems.

Figure 2:
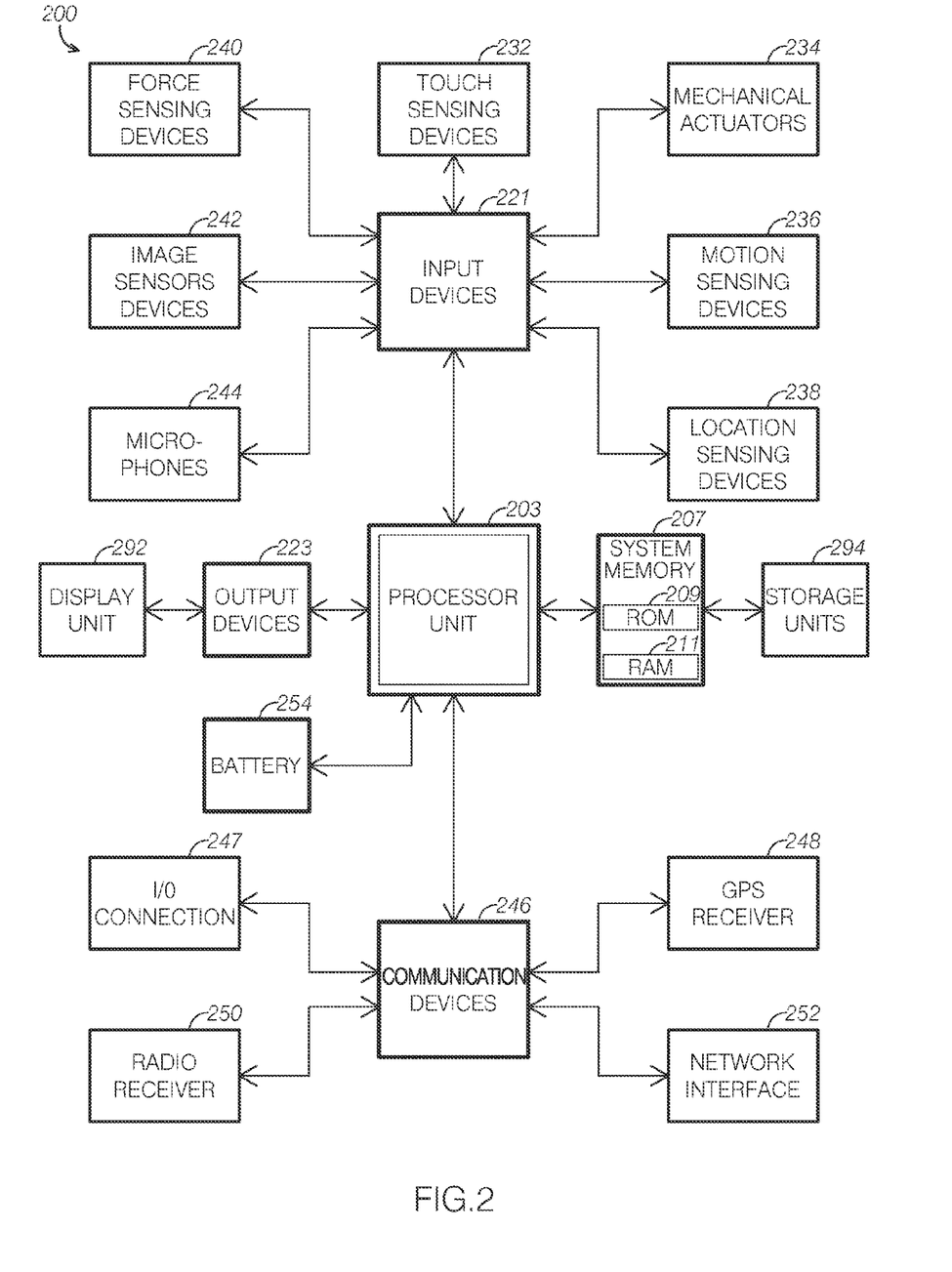
FIG. 2 shows a schematic view of an example of a mobile electronic device.

With reference to FIG. 2, an exemplary mobile device, mobile device 200, may include a processor unit 203 (e.g., CPU) configured to execute instructions and to carry out operations associated with the mobile device. For example, using instructions retrieved from memory, the controller may control the reception and manipulation of input and output data between components of the mobile device. The controller can be implemented on a single chip, multiple chips or multiple electrical components. For example, various architectures can be used for the controller, including dedicated or embedded processor, single purpose processor, controller, ASIC, etc. By way of example, the controller may include microprocessors, DSP, A/D converters, D/A converters, compression, decompression, etc.

In most cases, the controller together with an operating system operates to execute computer code and produce and use data. The operating system may correspond to well-known operating systems such as iOS, Symbian, Windows-based (including Windows Mobile and Windows 8), or Android operating systems, or alternatively to special purpose operating system, such as those used for limited purpose appliance-type devices. The operating system, other computer code and data may reside within a system memory 207 that is operatively coupled to the controller. System memory 207 generally provides a place to store computer code and data that are used by the mobile device. By way of example, system memory 207 may include read-only memory (ROM) 209, random-access memory (RAM) 211, etc. Further, system memory 207 may retrieve data from storage units 294, which may include a hard disk drive, flash memory, etc. In conjunction with system memory 207, storage units 294 may include a removable storage device such as an optical disc player that receives and plays DVDs, or card slots for receiving mediums such as memory cards (or memory sticks).

Mobile device 200 also includes input devices 221 that are operatively coupled to processor unit 203. Input devices 221 are configured to transfer data from the outside world into mobile device 200. As shown, input devices 221 may correspond to both data entry mechanisms and data capture mechanisms. In particular, input devices 221 may include the following touch sensing devices 232 such as touch screens, touch pads and touch sensing surfaces; mechanical actuators 234 such as button or wheels or hold switches; motion sensing devices 236 such as accelerometers; location detecting devices 238 such as global positioning satellite receivers, WiFi based location detection functionality, or cellular radio based location detection functionality; force sensing devices 240 such as force sensitive displays and housings; image sensors 242; and microphones 244. Input devices 221 may also include a clickable display actuator.

Mobile device 200 also includes various output devices 223 that are operatively coupled to processor unit 203. Output devices 223 are configured to transfer data from mobile device 200 to the outside world. Output devices 223 may include a display unit 292 such as an LCD, speakers or jacks, audio/tactile feedback devices, light indicators, and the like.

Mobile device 200 also includes various communication devices 246 that are operatively coupled to the controller. Communication devices 246 may, for example, include both an I/O connection 247 that may be wired or wirelessly connected to selected devices such as through IR, USB, or Firewire protocols, a global positioning satellite receiver 248, and a radio receiver 250 which may be configured to communicate over wireless phone and data connections. Communication devices 246 may also include a network interface 252 configured to communicate with a computer network through various means which may include wireless connectivity to a local wireless network, a wireless data connection to a cellular data network, a wired connection to a local or wide area computer network, or other suitable means for transmitting data over a computer network.

Mobile device 200 also includes a battery 254 and possibly a charging system. Battery 254 may be charged through a transformer and power cord or through a host device or through a docking station. In the cases of the docking station, the charging may be transmitted through electrical ports or possibly through an inductance charging means that does not require a physical electrical connection to be made.

The various aspects, features, embodiments or implementations of the invention described above can be used alone or in various combinations. The methods of this invention can be implemented by software, hardware or a combination of hardware and software. The invention can also be embodied as computer readable code on a computer readable medium. The computer readable medium is any data storage device that can store data which can thereafter be read by a computer system, including both transfer and non-transfer devices as defined above. Examples of the computer readable medium include read-only memory, random access memory, CD-ROMs, flash memory cards, DVDs, magnetic tape, optical data storage devices, and carrier waves. The computer readable medium can also be distributed over network-coupled computer systems so that the computer readable code is stored and executed in a distributed fashion.

Figure 3:
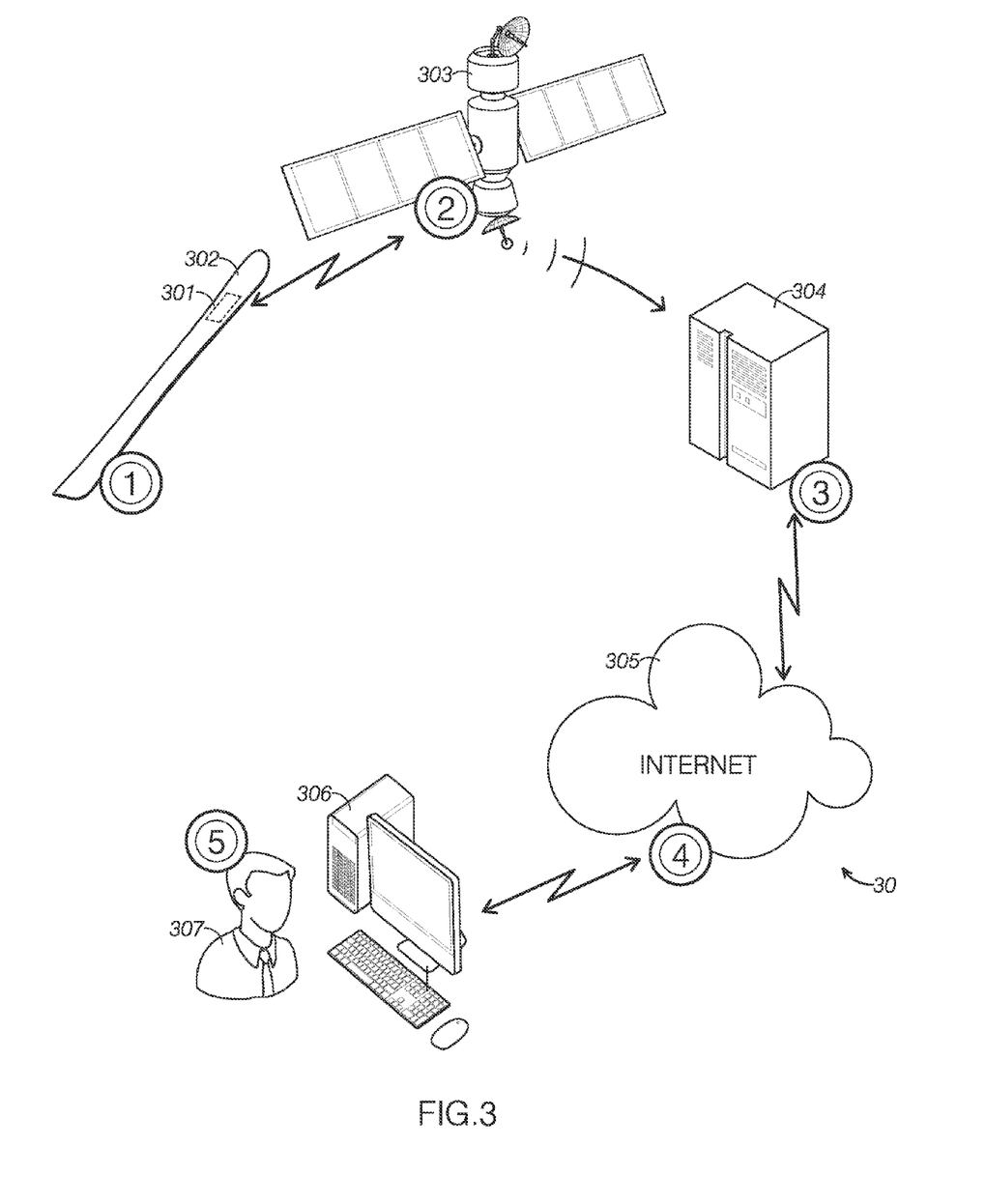
FIG. 3 is a diagram of an example of an embedded location tracking system for sports equipment.

FIG. 3 provides an overview of the various components of the disclosed embedded location tracking system. As shown in FIG. 3, system 30 includes a GPS locator tag 301. The locator tag 301 can communicate with wireless data network 303 (depicted here as a satellite, but as will be explained below can be implemented using a variety of technologies), which in turn is in communication with a central server 304. Central server 304 makes available over the Internet 305 an interface, which is accessed by user 307 via computer 306. Computer 306 can be implemented as either a computer 101 or a mobile device 200.

As can be seen in FIGS. 4A to 4D, the GPS locator tag 301 is ideally embedded into sports equipment 302. This is depicted by the dashed lines, representing a possible placement of the locator tag 301. Ideally, the locator tag 301 is embedded in a location in the sports equipment 302 that will present minimal interference to radio communications with the locator tag 301, have minimal impact on the structural integrity and performance of the sports equipment 302, but result in the sports equipment 302 being rendered practically useless should an attempt to remove the locator tag 301 be made.

Figure 4A:
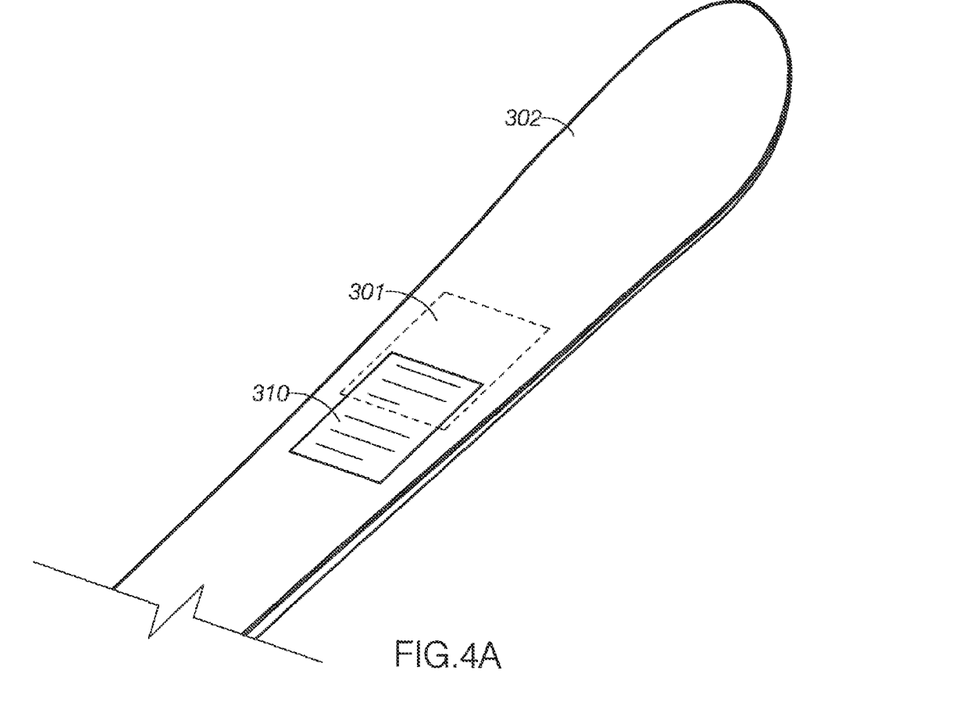
FIG. 4A is a close-up perspective view of the sports equipment shown in FIG. 3 depicting an example placement of an embedded locator tag.
Figure 4B:
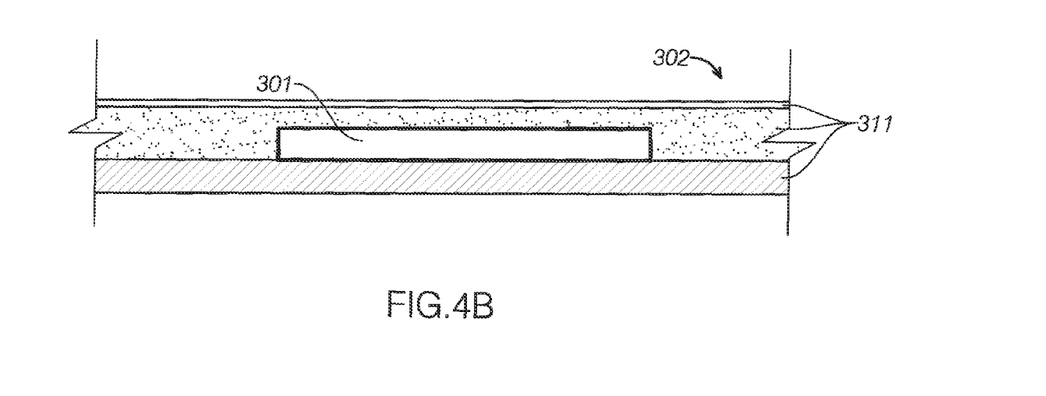
FIG. 4B is a cross-sectional view of the example placement of an embedded locator tag shown in FIG. 4A.

FIG. 4B provides a cross-sectional view of a possible embedment of the locator tag 301 where sports equipment 302 is a ski or snowboard. The locator tag 301 is placed between the substrate layers 311 of the sports equipment 302 in a position such that removal will damage the structural integrity of the ski or snowboard, and thereby render it useless. Placement of the locator tag 301 in this fashion will typically be performed during the manufacture of the sports equipment 302, but could be retroactively performed by a technician with the proper skills, training and equipment. Preferably, a sticker 310 is affixed upon the sports equipment 302 notifying the general public of the presence of the locator tag 301, so as to discourage potential thieves. Sticker 310 could instead be implemented as a permanent marking, or as part of the decorative design of the sports equipment 302.

Figure 4C:
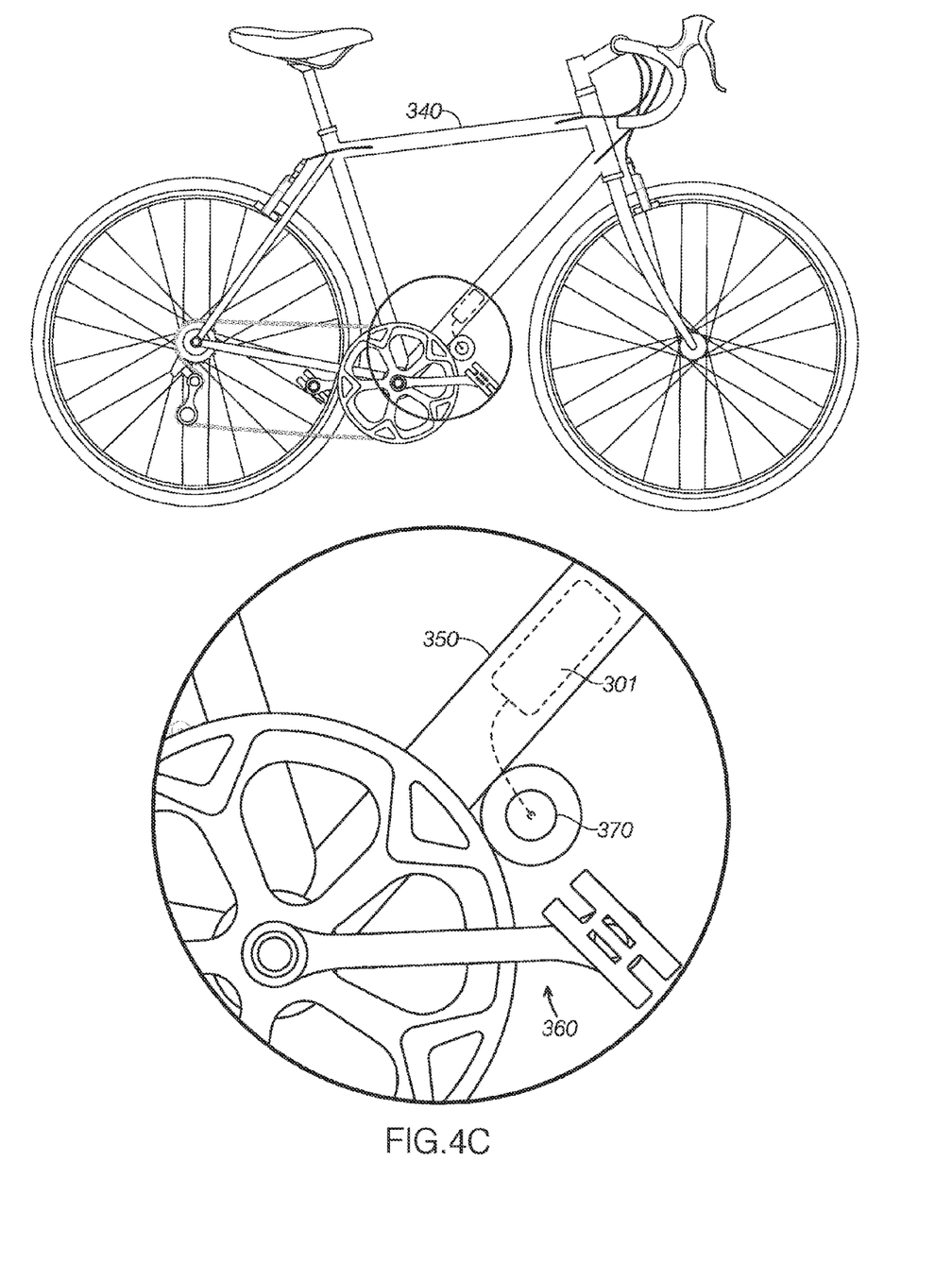
FIG. 4C is a cross-sectional view of a second example placement of an embedded locator tag.

Likewise, FIG. 4C provides a cross-sectional view of a possible embedment of the locator tag 301 where sports equipment 302 is a bicycle 340. In this example, the locator tag 301 is placed within the frame tube 350 of the bicycle 340 in a location such that the tag could not be removed without causing serious damage to the frame of the bicycle 340, thereby rendering the bicycle 340 unsafe to ride, and hence unusable. Such a location could include near the base of the bicycle frame, shown as location 360, where the frame meets the pedal crank. As with a ski or snowboard, the locator tag 301 is ideally placed within the bicycle 340 during the manufacturing process, prior to the frame being completed and sealed. Alternatively, a worker with the necessary skills to open and reclose the frame (either by welding or other technique, depending upon the materials used to construct the frame) could install the locator tag 301 after the bicycle's 340 manufacture. Also shown in FIG. 4C is dynamo 370, which can optionally be deployed on bicycle 340 to supply power to the locator tag 301, and/or recharge its battery.

Figure 4D:
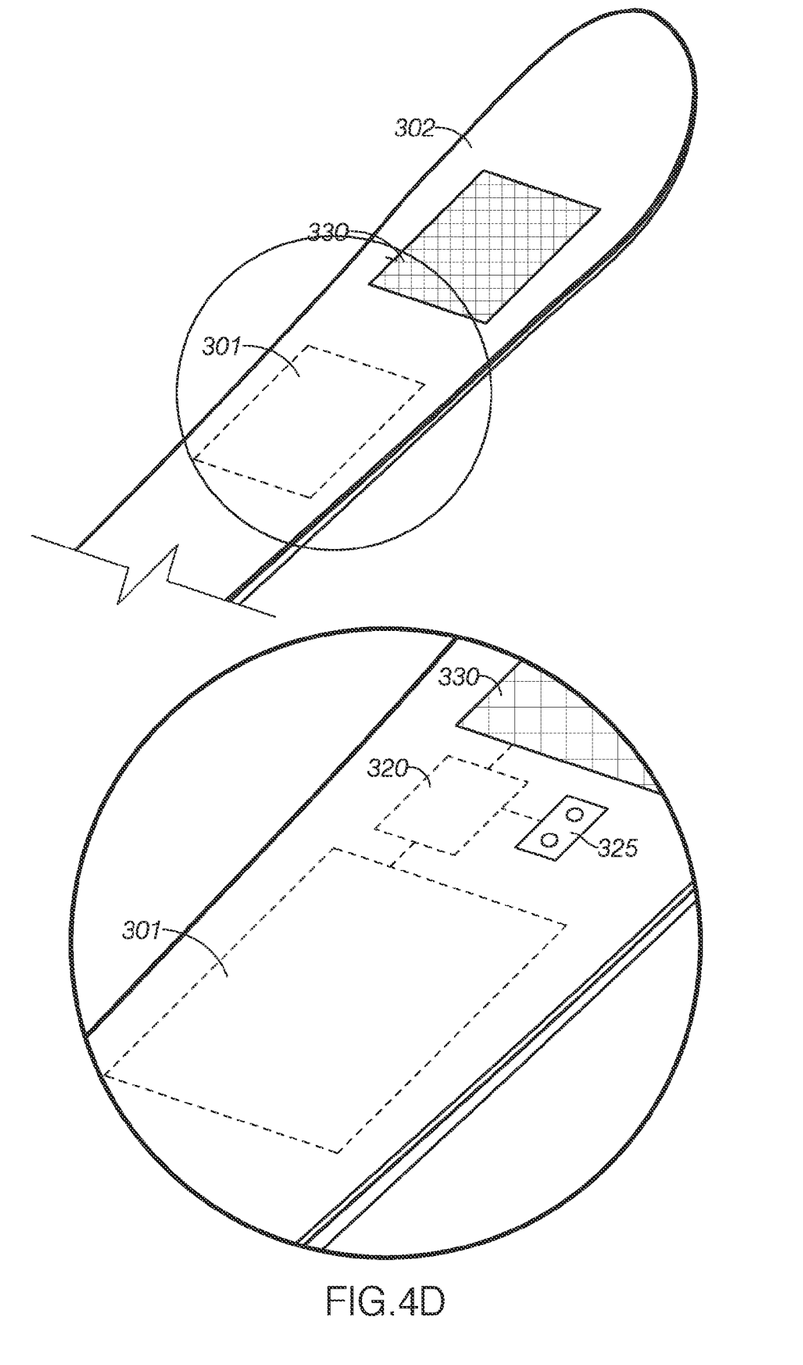
FIG. 4D is a cross-sectional view of the battery charging apparatus of an embedded locator tag.

FIG. 4D shows possible charging apparatus arrangements. The battery 320 of locator tag 301 can optionally be continuously charged via an onboard power source such as an incorporated solar cell 330, or if the sports equipment 302 so accommodates it, a generator similar to dynamo 370 shown on bicycle 340. For external charging, a charge port 325 can be provided. It will be appreciated by a person skilled in the relevant art that charge port 325 can be implemented in a variety of ways, including a plug with contacts that is otherwise covered by an environmental seal, external exposed contacts embedded into the surface of sports equipment 302 that can mate with a cradle or external holder, an embedded inductive charging coil that can transfer power from a corresponding external coil, which would obviate the need for an externally accessible charge port, or any other now known or later devised methods of transmitting power to a battery for charging.

Locator tag 301 is comprised of any currently known or later developed technology that allows for the determination of the tag's geographic location and transmission of the same to a data network. The locator tag 301 can use GPS, GLONASS, Galileo, or any other now known or later developed system for geographic location. Likewise, the locator tag 301 can be implemented to communicate with a wireless data network over any number of different communications protocols, such as NFC, WiFi, Bluetooth, cellular technologies including TDMA, CDMA, EV-DO, GSM, HSPA, or LTE, satellite communications systems, or any other now known or later developed wireless data communications system. An example of current technology that could be used to implement wide-area wireless data communications is the radio chipset found in many modern cellular phones, which are capable of transmitting and receiving on a variety of RF bands, using a variety of the aforementioned protocols, thus enabling a locator tag 301 to communicate via any current cellular network provider. In the event the locator tag 301 is in use but is out of range or otherwise not in communication with a wireless data network, locator tag 301 ideally is equipped with storage memory, so that it can continue to update its location while storing historical location data. This historical location data can then be transmitted and cleared once wireless data network communications are restored.

Locator tag 301 may optionally be equipped with the capability to directly communicate with a mobile device 200 or computer 101, via any technology now known or later developed. Such technologies may include Bluetooth, WiFi, or Near-Field Communications. Direct communications can be used to directly supply location information to a user's computer 101 or mobile device 200 for a variety of purposes, such as greater storage capacity, input into various applications such as fitness software or mapping displays, enhanced situational awareness, or direct control of the locator tag 301 for setting parameters, diagnostics, and monitoring of the tag's health.

If the locator tag requires a power source, ideally it will be implemented as a rechargeable battery cell, which can be charged either by a power port, a wireless charging system, solar cell integrated into the sports equipment 302, magnetos or other generating devices that can capture energy from the motion of sports equipment 302 (if the equipment is suitable for such a power source, such as a bicycle) or another method known or to be developed that facilitates battery charging without the need to access the battery, so as to maintain the integrity of the embedded locator tag 301 and not present an easy method for a thief to disable the locator tag 301. If a replaceable battery is needed, it should be secured in a fashion capable of only being accessed by the owner of the sports equipment 302, so as to prevent a thief from disabling the locator tag 301 by removing the battery. Locator tag 301 is provided with a unique ID code, which allows it to be addressed and tracked by the system 30.

In the example shown in FIG. 3, wireless data network 303 is implemented using any system that allows for wireless communications. Preferably, the implemented wireless communications technology will allow for wide area, ideally global, communications with the locator tag 301. Examples of such preferred systems include a satellite communications system, cellular data network, or other vide-area radio communications system. Currently available technology could include any commercially available telecommunications system, such as provided by Verizon Wireless, AT&T, T-Mobile, or Sprint in the case of terrestrial communications, or Iridium®, in the case of satellite communications. Satellite communications would be particularly useful when the user of a piece of equipment implementing the disclosed invention intends to engage in activities that are out of communications range with any available terrestrial-based system. Conversely, if the equipment will be predominantly used in a controlled area, such as a ski resort or along established bike or ski trails, a wireless communications network implemented using local-area network technologies, such as a meshed network of WiFi hotspots and routers, may prove advantageous and cost-effective. Other possible implementations of wireless data network 303 include a purpose-built network dedicated to use with the system 30.

Central server 304, in turn, is in communication with wireless data network 303. Central server 304 is ideally implemented using a computer 101, as disclosed above. Central server 304 receives location updates from the locator tag 301 via the wireless data network 303. In some implementations, central server 304 can use wireless data network 303 to ping the locator tag 301, forcing a location update. Central server 304 is further in communication with a data network that allows it to communicate with users of the system 30. As shown in FIG. 3, this is ideally the Internet 305. Central server 304 provides an Internet-accessible service, such as a web page, which the user 307 can access using a computer 306. Computer 306 is ideally implemented as either a computer 101, or a mobile device 200. The Internet-accessible service allows the user 307 to log into a secure account owned by the user 307 and query the location of locator tag 301, and by connection, the location of the sports equipment 302. This Internet-accessible service can be accessed using a web browser, such as Internet Explorer®, Google Chrome®, or Firefox®, or using purpose-built client software or an app capable of being run on a mobile device 200.

It will be appreciated by a person skilled in the relevant art that in some implementations central server 304 and computer 306 may be the same machine, where the user 307 uses computer 306 to directly contact the locator tag 301. This can be the case when the wireless data network 303 is implemented using a direct communications link to the locator tag such as WiFi, NFC, or Bluetooth.

Figure 5:
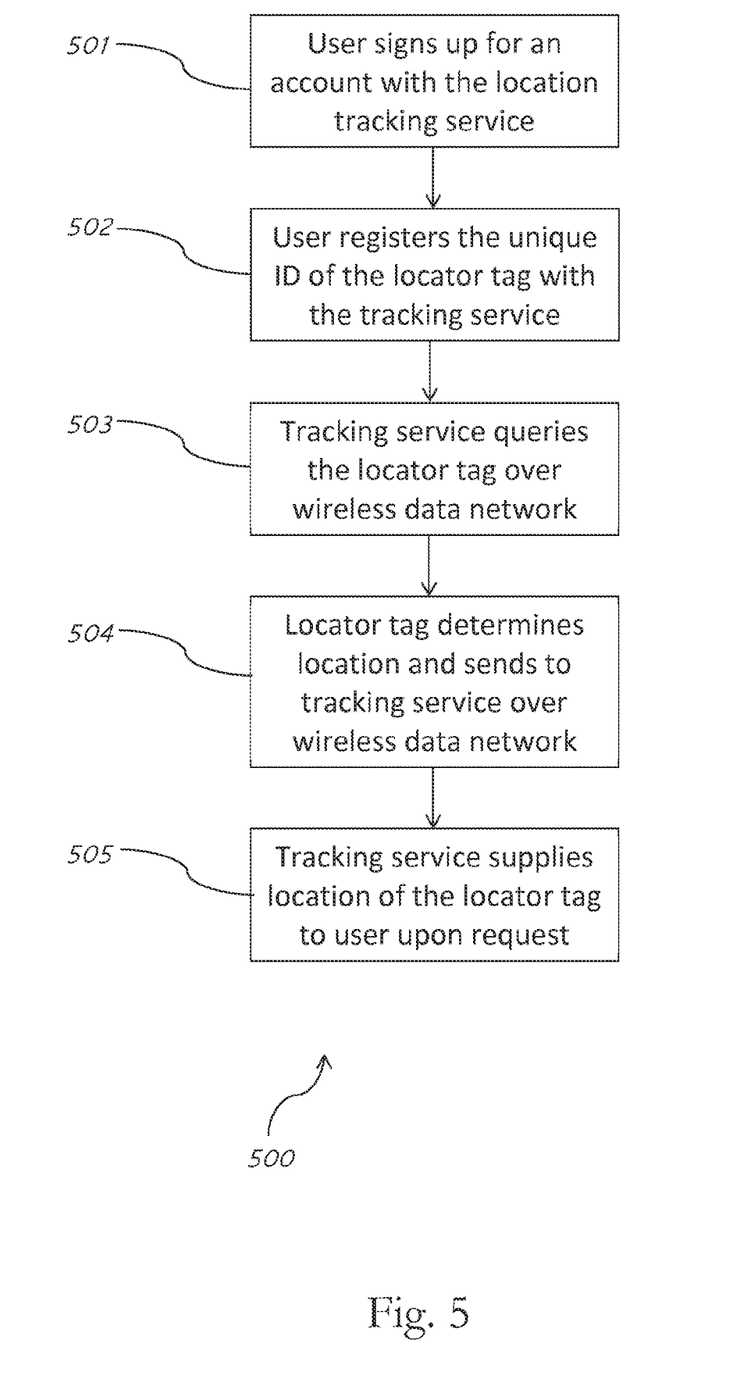
FIG. 5 is a flowchart of the steps a user takes to access the location of the embedded locator tag.

Turning attention to FIG. 5, a method 500 of using and the operation of the example Embedded Location Tracking System for Sports Equipment will now be described. Method 500 includes signing up for an account with a location tracking service in step 501, registering the locator tag 301 unique ID with the tracking service in step 502, the tracking service obtaining the locator tag's 301 location in steps 503 and 504, and finally, the locating service providing the user with the location of the locator tag 301 upon request in step 505.

In step 501, a user of system 30 ideally initially signs up with a location tracking service, which may be hosted on central server 304. This allows the user to keep track of multiple pieces of sports equipment 302 that are all equipped with locator tags 301. The user can provide a username and password, as is typical for online services. Once the user's account is established, in step 502 the user will enter the unique ID codes for each locator tag 301 that the user wishes to track, thereby associating the sports equipment 302 with the user. The unique ID codes are typically supplied to the user by the person who installs the embedded locator tag, usually the manufacturer of the sports equipment 302. Steps 501 and 502 are not necessary, however, for system 30 to work; all that is needed to determine the location of a locator tag 301 is the tag's unique ID code.

In step 503, the tracking service uses the supplied unique ID code to request the location of the associated locator tag 301 over the wireless data network 303. The wireless data network 303 can respond with the location of the locator tag 301 if it has the location cached, and the location is not considered stale, e.g. older than a minute or two, or any other time as may be established by a user. Alternatively, the tracking service can send a request over the wireless data network 303 that the locator tag 301 associated with the supplied unique ID obtain and reply with a refreshed location over the wireless data network 303, thus carrying out step 504. Also, the locator tag 301 can transmit its location history stored in the locator tag's 301 memory over the wireless data network 303, for example either on request from the user through the tracking service, or automatically in response to having lost contact with wireless data network 303 and subsequently regaining it. Steps 503 and 504 can further be continuously repeated at regular intervals, so as to provide an ongoing updated location, similar to the GPS systems used for vehicle navigation.

Finally, in step 505 the user is able to view the location of the requested locator tag 301 and associated sports equipment 302 via the tracking service. This may include providing geographic coordinates (latitude and longitude), and/or presenting the location on a map, such as may be provided by a mapping service like Google Maps or Apple Maps. Additional information can also be provided, including a historical view of the locator tag's 301 location, allowing the user to see the tracks where the sports equipment 302 has traveled. This information could be used to locate a possible thief, by the user to keep track of their travels (such as in the case of cross-country skiing, where a user may wish to map their route), or even by other users who wish to locate a friend, provided they have the unique ID code of the locator tag 301 in the friend's sports equipment 302. Alternatively, the tracking service may provide a way for the users to share their locations with other users.

The disclosure above encompasses multiple distinct inventions with independent utility. While each of these inventions has been disclosed in a particular form, the specific embodiments disclosed and illustrated above are not to be considered in a limiting sense as numerous variations are possible. The subject matter of the inventions includes all novel and non-obvious combinations and subcombinations of the various elements, features, functions and/or properties disclosed above and inherent to those skilled in the art pertaining to such inventions. Where the disclosure or subsequently filed claims recite "a" element, "a first" element, or any such equivalent term, the disclosure or claims should be understood to incorporate one or more such elements, neither requiring nor excluding two or more such elements.

Applicant(s) reserves the right to submit claims directed to combinations and subcombinations of the disclosed inventions that are believed to be novel and non-obvious. Inventions embodied in other combinations and subcombinations of features, functions, elements and/or properties may be claimed through amendment of those claims or presentation of new claims in the present application or in a related application. Such amended or new claims, whether they are directed to the same invention or a different invention and whether they are different, broader, narrower or equal in scope to the original claims, are to be considered within the subject matter of the inventions described herein.

The invention claimed is:

1. A sports equipment tracking system, comprising:
    an item of sports equipment possessing a substrate; and
    a location tag device embedded within said substrate, where said device determines its own current location and transmits said location via radio communications, where said device is embedded such that removal of said device will result in damage to said item of sports equipment sufficient to render said item unusable or without significant value.

2. The sports equipment tracking system of claim 1, wherein said location tag device is capable of communicating with a wireless data communications network.

3. The sports equipment tracking system of claim 2, wherein said wireless data communications network is a commercial cellular communications network.

4. The sports equipment tracking system of claim 2, wherein said wireless data communications network is a satellite-based communications network.

5. The sports equipment tracking system of claim 1, wherein said sports equipment comprises a bicycle.

6. The sports equipment tracking system of claim 1, wherein said sports equipment comprises a board.

7. The sports equipment tracking system of claim 1, wherein said location tag device includes a rechargeable battery and an externally accessible charging port.

8. The sports equipment tracking system of claim 1, wherein said location tag device includes a rechargeable battery and a means to charge said battery wirelessly.

9. The sports equipment tracking system of claim 1, wherein said location tag device includes a rechargeable battery and a means to charge said battery by generating electricity from the motion of said item of sports equipment.

10. A sports equipment tracking system, comprising:
    a location tag device that determines its own current location and transmits said location via radio communications, where
    said device is configured and sized to be embedded within the substrate of an item of sports equipment such that removal of said device will result in damage to said item of sports equipment sufficient to render said item unusable or without significant value; and
    said device is capable of communication with a wireless data communications network via said radio communications;
    a wireless data communications network; and
    control software capable of interacting with said location tag device via said wireless data communications network.

11. The sports equipment tracking system of claim 10, further comprising a power source configured to supply power to said location tag device.

12. The sports equipment tracking system of claim 11, wherein said power source is a rechargeable battery.

13. The sports equipment tracking system of claim 12, wherein said rechargeable battery is capable of being recharged from the motion of an item of sports equipment in which said location tag device is embedded.

14. The sports equipment tracking system of claim 10, wherein said location tag device is capable of continuously updating its location, and storing a history of its location.

15. The sports equipment tracking system of claim 14, wherein said control software is capable of retrieving said history stored by said location tag device.

16. The sports equipment tracking system of claim 10, further comprising an item of sports equipment, where said item of sports equipment is a bicycle.

17. The sports equipment tracking system of claim 10, further comprising an item of sports equipment, where said item of sports equipment is a ski or snowboard.

18. The sports equipment tracking system of claim 10, further comprising an item of sports equipment, where said item of sports equipment is a paddleboard or windsurfing board.

19. The sports equipment tracking system of claim 10, wherein said wireless data communications network is a direct communications link between said location tag device and said control software.

20. The sports equipment tracking system of claim 10, further comprising
    a central computer server in communication with said wireless data communications network, said central computer server capable of executing said control software; and
    a user-operated computer in communication with said central computer server.

* * * * *